(12) United States Patent  
Takasaka

(10) Patent No.: US 6,536,695 B2
(45) Date of Patent: Mar. 25, 2003

(54) MAGNETIC TAPE APPARATUS

(75) Inventor: Daisuke Takasaka, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 23 days.

(21) Appl. No.: 09/739,248

(22) Filed: Dec. 19, 2000

(65) Prior Publication Data

US 2001/0004093 A1 Jun. 21, 2001

(30) Foreign Application Priority Data

Dec. 20, 1999 (JP) ............................................ 11-009605

(51) Int. Cl.$^7$ ............................................... G11B 15/22
(52) U.S. Cl. ................................. 242/355.1; 188/250 B
(58) Field of Search ........................ 242/355.1, 355.2, 242/343.2; 188/250 E, 250 B, 258

(56) References Cited

U.S. PATENT DOCUMENTS

| 3,866,856 A | * | 2/1975 | Katoh | 242/332.5 |
| 3,920,104 A | * | 11/1975 | Hoffmann | 188/73.31 |
| 4,223,855 A | * | 9/1980 | Briedis | 242/333.7 |
| 4,303,954 A | * | 12/1981 | Weisser | 360/90 |
| 5,114,093 A | * | 5/1992 | Kunimaru et al. | 242/355.1 |
| 5,217,180 A | * | 6/1993 | Ruyten et al. | 242/355.1 |
| 5,398,880 A | * | 3/1995 | Sawai et al. | 242/343.2 |
| 6,119,823 A | * | 9/2000 | Nagaoka | 188/82.84 |

FOREIGN PATENT DOCUMENTS

| JP | 60-178632 | | 11/1985 |
| JP | 1-113837 | | 7/1989 |
| JP | 2-265891 | * | 10/1990 |
| JP | 2-287943 | | 11/1990 |
| JP | 6-243544 | * | 9/1994 |

* cited by examiner

Primary Examiner—Donald P. Walsh
Assistant Examiner—Joseph Rodriguez
(74) Attorney, Agent, or Firm—Crowell & Moring LLP

(57) ABSTRACT

A magnetic tape apparatus includes a pair of reel tables adapted to be detachably engaged with a tape cassette and rotatably disposed on a chassis with a determined space therebetween, and a pair of brake members which are adapted to be press-contacted and separated with respect to the reel tables by way of brake pads. Each of the brake members is provided with a projection at one end portion of a tip end face thereof and a recess adjacent to the other end portion of the tip end face. Each of the brake pads is provided with a slit at its one end portion, the slit being engaged with the projection, and the other end portion of the brake pad being pushed into the recess.

7 Claims, 4 Drawing Sheets

FIG. 5 PRIOR ART
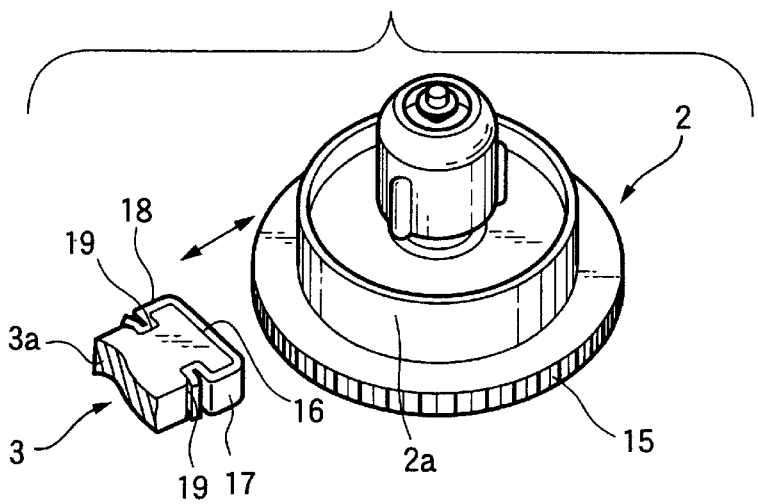
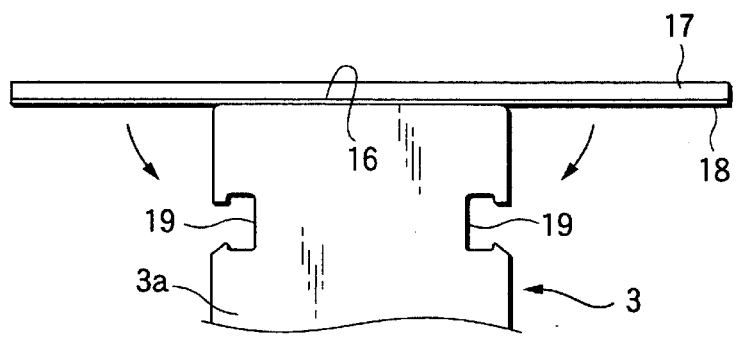
FIG. 6A PRIOR ART
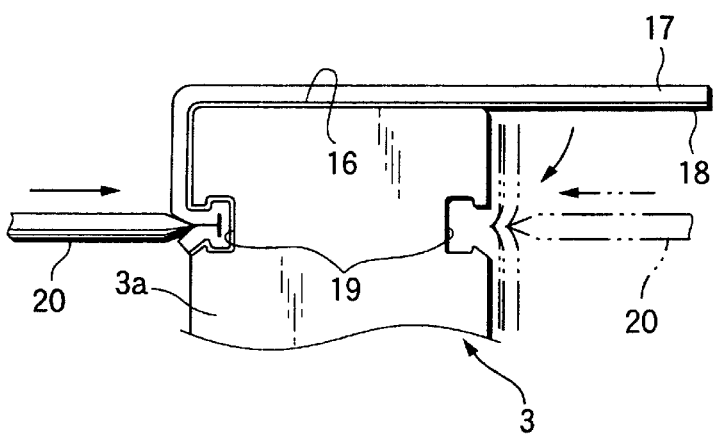
FIG. 6B PRIOR ART
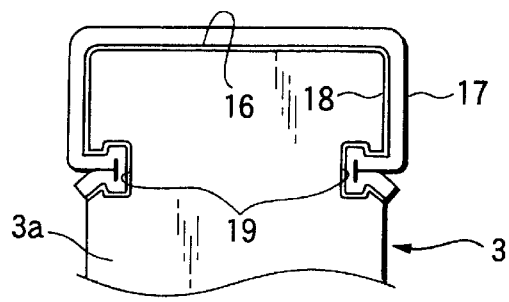
FIG. 6C PRIOR ART

1

MAGNETIC TAPE APPARATUS

BACKGROUND OF THE INVENTION

The present invention relates to a magnetic tape apparatus for conducting reproduction, recording, erasing, etc. of information recorded in magnetic tapes.

An example of conventional magnetic tape apparatus is shown in FIG. 4. This apparatus includes a pair of reel tables 2 which are rotatably disposed on a chassis with a determined space therebetween, a pair of brake members 3 which can be press-contacted and separated with respect to the reel tables 2, a pair of left and right elongated holes 5 which are formed in the chassis 1 on both sides of a head cylinder 4, a pair of moving carriers 6 which are engaged in the elongated holes 5 so as to move in directions of arrows a and b, and movable guide posts 7 which are uprightly provided on the moving carriers 6 respectively. Numeral 8 represents an all width erasing head, 9 represents a voice erasing head, 10 represents a voice control head, 11 represents a stationary guide post, 12 represents a capstan, 13 represents a pinch roller which can be press-contacted and separated with respect to the capstan 12, and 14 represents a tension post.

In the above described structure, in order to load a tape cassette T, the tape cassette T is inserted into an insertion opening of a case body (not shown), and the tape cassette T is lowered vertically after it has been horizontally moved backward. With this action, the tape cassette T is detachably engaged with the reel tables 2, as shown by a solid line in FIG. 4. Then, the moving carriers 6 move along the elongated holes 5 in a direction of the arrow a, whereby the magnetic tape t is drawn out from the tape cassette T as shown by a phantom line in FIG. 4, and wound around the head cylinder 4. At the same time, the tension post 14 is pressed to the magnetic tape t.

Then, in reproducing mode and fast forwarding mode for example, the reel table 2 on the right hand is rotated in a direction of an arrow c to wind up the magnetic tape t, and in rewinding mode, the reel table 2 on the left hand is rotated in a direction of an arrow d to rewind the magnetic tape t.

When each of the modes such as the reproducing mode has stopped, the brake members 3 are press-contacted with outer peripheral faces 2a of the reel tables 2 by means of a mode selection lever (not shown), to apply brakes to the reel tables 2 thereby preventing a slack of the magnetic tape t.

Conventionally, a tip end portion 3a of each of the brake members 3 is formed in a shape of a rectangular plate as shown in FIG. 5, and a brake pad 17 made of felt or the like is bonded to a tip end face 16 of the tip end portion 3a by means of a double-faced tape 18 with both end portions of the brake pad 17 pushed into a pair of right and left recesses 19 which are formed at both side faces of the tip end portion 3a. In FIG. 5, numeral 15 represents a gear part formed around the reel table 2 which is adapted to mesh with an idler gear (not shown) to transmit rotary driving force of a capstan motor to the reel table 2.

Steps of fitting the above described brake pad 17 will be explained referring to FIGS. 6A to 6C. After a middle part of the brake pad 17 attached with the double-faced tape 18 is applied to the tip end face 16 as shown in FIG. 6A, one end portion of the brake pad 17 may be folded and pushed into one of the recesses 19 by means of a tool 20 to be locked therein, and then, the other end portion of the brake pad 17 may be folded and pushed into the other recess 19 by means of the tool 20 to be locked therein. In this manner, the brake member 3 provided with the brake pad 17 can be completed as shown in FIG. 6C.

In the above described structure, since both the end portions of the brake pad 17 must be pushed into the respective recesses 19 employing the tool 20, the pushing motions will take troubles and a considerable time.

SUMMARY OF THE INVENTION

In view of the above described drawback, it is an object of the invention to provide a magnetic tape apparatus in which brake pads can be easily and reliably engaged with brake members.

In order to attain the above described object, the invention according to aspect 1 is a magnetic tape apparatus comprising a pair of reel tables adapted to be detachably engaged with a tape cassette and rotatably disposed on a chassis with a determined space therebetween, and a pair of brake members which can be press-contacted and separated with respect to the reel tables by way of brake pads, characterized in that each of the brake members is provided with a projection at one end portion of a tip end face thereof and a recess adjacent to the other end portion of the tip end face, and each of the brake pads is provided with a slit at its one end portion, the slit being engaged with the projection, and the other end portion of the brake pad being pushed into the recess, whereby the brake pad is fitted to the tip end face of the brake member.

According to the above described structure, only by hooking the slit formed at the one end portion of the brake pad on the projection of the brake member, the one end portion of the brake pad can be easily engaged with the brake member without employing a tool. Further, by simply pushing the other end portion of the brake pad into the recess in the brake member, the other end portion of the brake pad can be reliably engaged with the brake member. Thus, fitting of the brake pad can be performed more rapidly and easily as compared with the conventional structure.

The invention according to aspect 2, in the invention as in aspect 1, is characterized in that the tip end face of the brake member is bent in a substantially C-shape in such a manner that one end portion of the tip end face is inclined at a determined angle in a direction apart from the reel table more than the other end portion of the tip end face, and the projection is contained within the inclined angle.

According to the above described structure, since the projection is contained within the inclined angle, the projection will not interfere with the reel table when the brake pad is press-contacted with the outer peripheral face of the reel table, hence braking function of the brake pad can be effectively exerted.

The invention according to aspect 3, in the invention as in aspect 1 or 2, is characterized in that the other end portion of the tip end face of the brake member is provided with a concave groove, both side edges of the concave groove being press-contacted with an outer peripheral face of the reel table by way of the brake pad.

According to the above described structure, because press portions at two points consisting of both the side edges are press-contacted with the outer peripheral face of the reel table by way of the brake pad, strong brakes can be applied to the reel table.

BRIEF DESCRIPTION OF THE DRAWINGS

FIG. 5 is a perspective view of an essential part of a conventional example.

FIGS. 6A to 6C are explanatory views showing steps of fitting a brake pad in the conventional example.

DETAILED DESCRIPTION OF THE PREFERRED EMBODIMENTS

Figure 1:
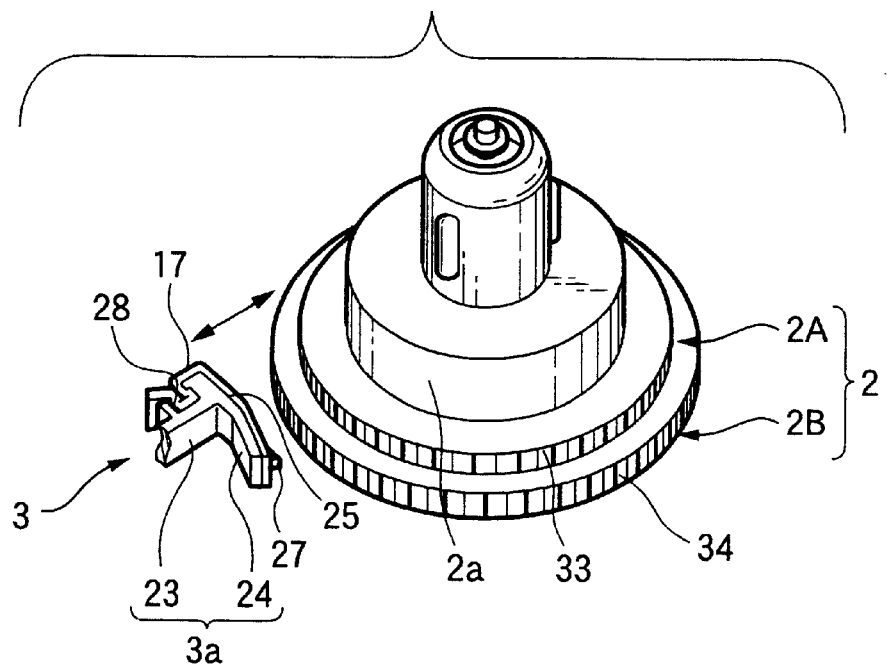
FIG. 1 is a perspective view of an essential part of a magnetic tape apparatus according to one embodiment of the invention.
Figure 4:
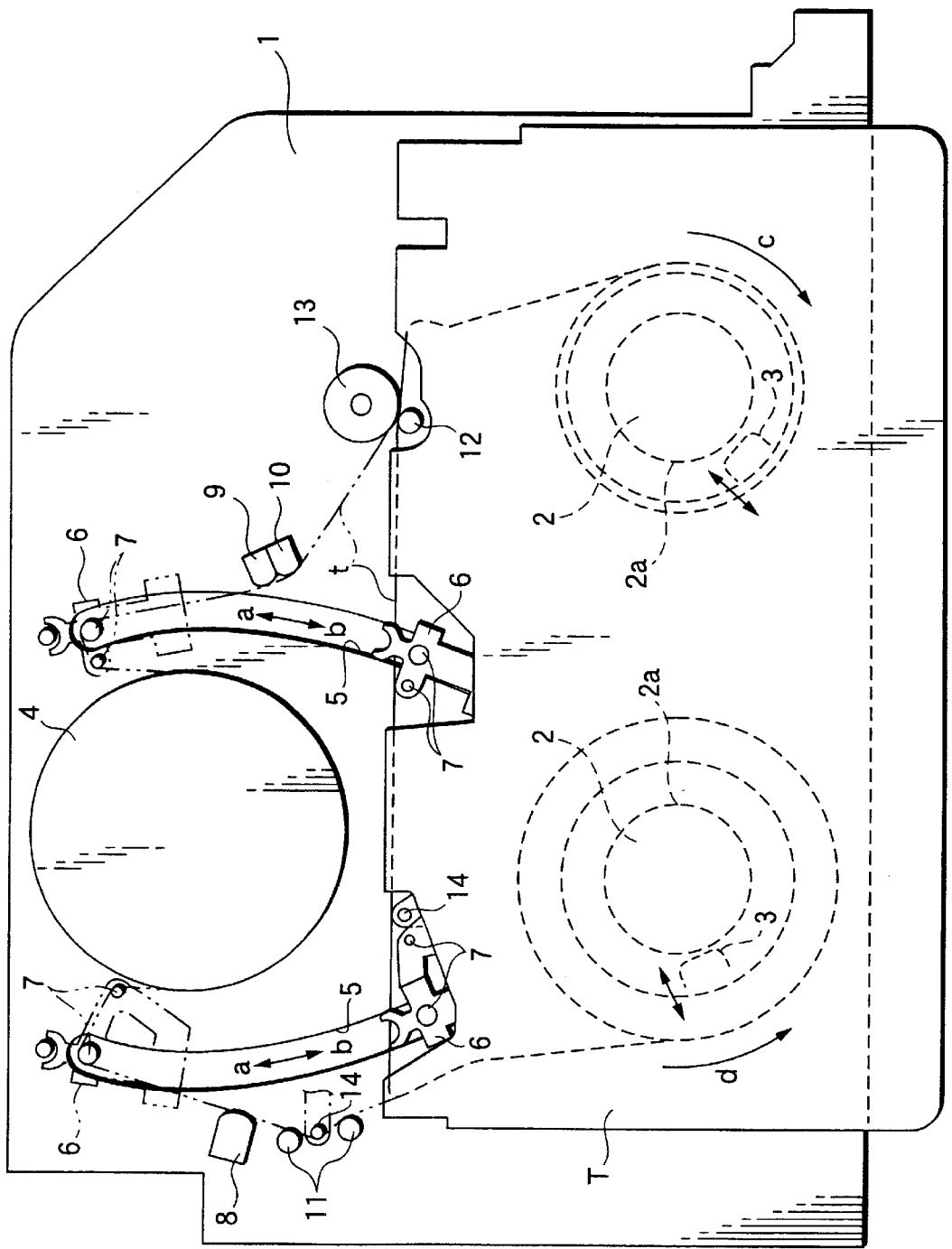
FIG. 4 is a schematic plan view of the magnetic tape apparatus.

FIG. 1 shows an essential part of a magnetic tape apparatus according to one embodiment of the invention. A reel table 2 consists of a reel table body 2A on which the tape cassette T is adapted to be engaged, and a rotary base 2B concentrically engaged with the reel table body 2A. Between the reel table body 2A and the rotary base 2B, is interposed a slip mechanism (not shown) coupling the reel table body 2A and the rotary base 2B and adapted to disconnect them when a determined amount of load has been applied. A brake member 3 is provided so as to be press-contacted and separated with respect to an outer peripheral wall 2a of the reel table body 2A by way of a brake pad 17. Because the structure except the above described is substantially the same as the structure which has been shown in FIGS. 4 and 5, the same components will be represented by the same reference numerals and their explanation will be omitted.

Figure 2:
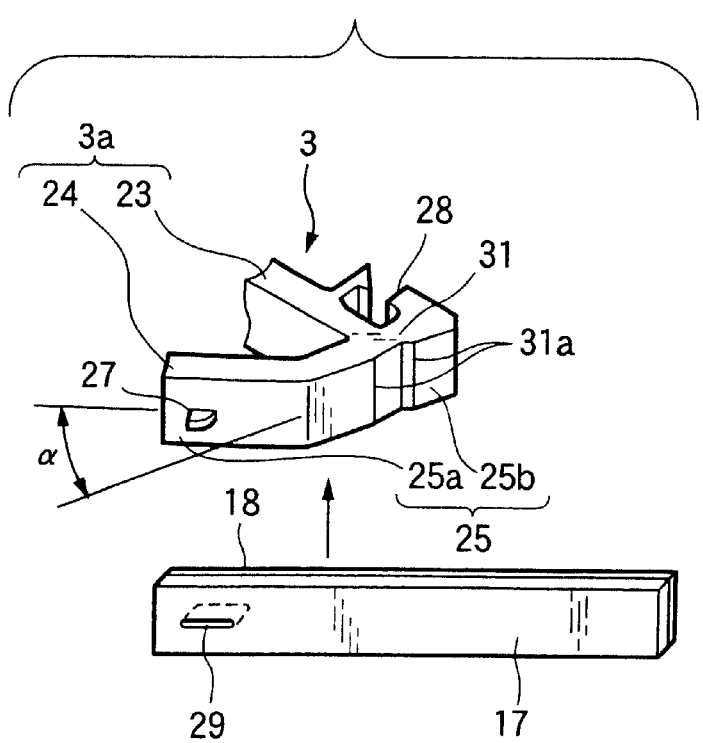
FIG. 2 is an exploded perspective view of the essential part.

The above described brake member 3 is molded of hard synthetic resin material. As shown in FIG. 2, a tip end portion 3a of the brake member 3 is formed in a substantially L-shape consisting of a vertical pillar portion 23 and a lateral pillar portion 24 which extends substantially at right angle from a tip end of the vertical pillar portion 23. A tip end face 25 of the lateral pillar portion 24 is bent in a substantially C-shape in such a manner that one end portion 25a of the tip end face 25 is inclined at a determined angle a in α direction apart from the reel table 2 more than the other end portion 25b. The one end portion 25a of the tip end face 25 is provided with a projection 27 to be contained within the inclined angle α and a recess 28 is formed at a side face of the vertical pillar portion 23. A slit 29 is further provided at one end portion of the brake pad 17.

Figure 3A:
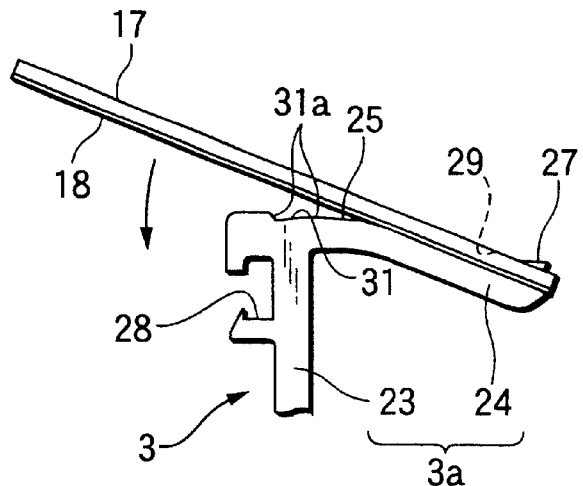
FIGS. 3A to 3C are explanatory views showing steps of fitting a brake pad of the same.
Figure 3B:
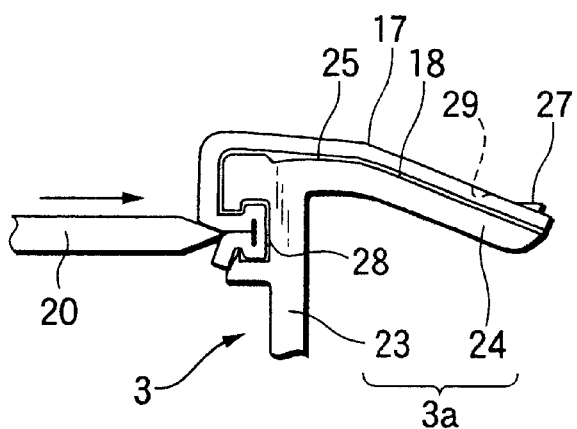
Figure 3C:
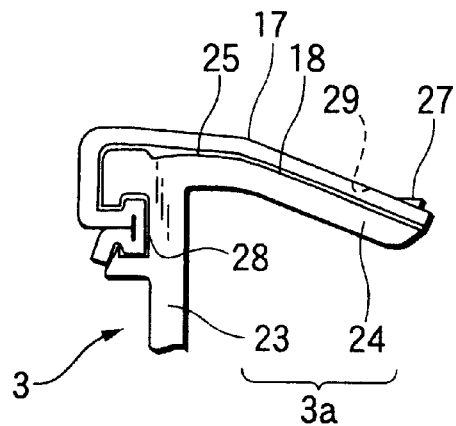

Referring now to FIGS. 3A to 3C, steps of fitting the above described brake pad 17 will be described. After the slit 29 formed at the one end portion of the brake pad 17 is hooked on the projection 27 as shown in FIG. 3A, the other end portion of the brake pad 17 may be folded and pushed into the recess 28 by means of the tool 20 to be locked therein as shown in FIG. 3B. In this manner, the brake member 3 provided with the brake pad 17 can be completed as shown in FIG. 3C.

According to the above described structure, only by hooking the slit 29 formed at the one end portion of the brake pad 17 on the projection 27 of the brake member 3, the one end portion of the brake pad 17 can be easily engaged with the brake member 3 without employing the tool 20. Further, by simply pushing the other end portion of the brake pad 17 into the recess 28 in the brake member 3, the other end portion of the brake pad 17 can be reliably engaged with the brake member 3. Thus, fitting of the brake pad 17 can be performed more rapidly and easily as compared with the conventional structure.

Moreover, since the projection 27 is contained within the inclined angle α, the projection 27 will not interfere with the reel table body 2A when the brake pad 17 is press-contacted with the outer peripheral face 2a of the reel table body 2A, hence braking function of the brake pad 17 can be effectively exerted.

As shown in FIG. 2, a concave groove 31 is formed in the other end portion 25b of the aforesaid tip end face 25. Both side edges 31a of the concave groove 31 are press-contacted with the outer peripheral face 2a of the reel table 2 by way of the brake pad 17.

According to the above described structure, because press portions at two points consisting of both the side edges 31a are press-contacted with the outer peripheral face 2a of the reel table body 2A by way of the brake pad 17, strong brakes can be applied to the reel table body 2A.

In FIG. 1, numerals 33, 34 represent gear parts provided respectively on the reel table body 2A and the rotary base 2B. In the fast forwarding mode and the rewinding mode, the idler gear is adapted to mesh with the gear part 33 of the reel table body 2A, while in the reproducing mode and the reproducing/rewinding mode, the idler gear is adapted to mesh with the gear part 34 of the rotary base 2B thereby to transmit the driving force of the capstan motor to the reel tables 2.

In the above described embodiment, the explanation has been made referring to the reel table 2 which is divided into the reel table body 2A and the rotary base 2B as an example. However, the invention is not limited to this example, but can be applied to a magnetic tape apparatus having the reel table 2 of an integral type (see FIG. 5).

According to the invention as in aspect 1, only by hooking the slit formed at the one end portion of the brake pad on the projection of the brake member, the one end portion of the brake pad can be easily engaged with the brake member without employing the tool. Further, by simply pushing the other end portion of the brake pad into the recess in the brake member, the other end portion of the brake pad can be reliably engaged with the brake member. Thus, fitting of the brake pad can be performed more rapidly and easily as compared with the conventional structure.

According to the invention as in aspect 2, since the projection is contained within the inclined angle, the projection will not interfere with the reel table when the brake pad is press-contacted with the outer peripheral face of the reel table, hence braking function of the brake pad can be effectively exerted.

According to the invention as in aspect 3, because the press portions at the two points consisting of both the side edges are press-contacted with the outer peripheral face of the reel table by way of the brake pad, strong brakes can be applied to the reel table.

What is claimed is:

1. A magnetic tape apparatus comprising:
   a pair of reel tables adapted to be detachably engaged with a tape cassette and rotatably disposed on a chassis with a determined space therebetween, and
   a pair of brake members adapted to be press-contacted with said reel tables and separated with respect to said reel tables by way of brake pads, wherein
   each of said brake members is provided with a projection at one end portion of a tip end face thereof and a recess adjacent to the other end portion of said tip end face, and
   each of said brake pads is provided with a slit at one end portion thereof, said slit being engaged with said projection, and the other end portion of said brake pad being pushed into said recess, so that said brake pad is fitted to said tip end face of said brake member.

2. The magnetic tape apparatus as claimed in claim 1, wherein said tip end face of said brake member is bent in a substantially C-shape in such a manner that the one end portion of said tip end face is inclined at a determined angle in a direction apart from said reel table more than the other end portion of said tip end face, and said projection is contained within the inclined angle.

3. The magnetic tape apparatus of claim 1 wherein the projection is disposed toward a respective reel table.

4. A magnetic tape apparatus comprising:

a pair of reel tables adapted to be detachably engaged with a tape cassette and rotatably disposed on a chassis with a determined space therebetween, and a pair of brake members adapted to be press-contacted with said reel tables and separated with respect to said reel tables by way of brake pads, wherein each of said brake members is provided with a projection at one end portion of a tip end face thereof and a recess adjacent to the other end portion of said tip end face, and each of said brake pads is provided with a slit at one end portion thereof, said slit being engaged with said projection, and the other end portion of said brake pad being pushed into said recess, so that said brake pad is fitted to said tip end face of said brake member, wherein said tip end face of said brake member is bent in a substantially C-shape in such a manner that the one end portion of said tip end face is inclined at a determined angle in a direction apart from said reel table more than the other end portion of said tip end face, and said projection is contained within the inclined angle, wherein the other end portion of said tip end face of said brake member is provided with a concave groove, both side edges of said concave groove adapted to be press-contacted with an outer peripheral face of said reel table by way of said brake pad.

5. A magnetic tape apparatus comprising:

a pair of reel tables adapted to be detachably engaged with a tape cassette and rotatably disposed on a chassis with a determined space therebetween, and a pair of brake members adapted to be press-contacted with said reel tables and separated with respect to said reel tables by way of brake pads, wherein each of said brake members is provided with a projection at one end portion of a tip end face thereof and a recess adjacent to the other end portion of said tip end face, and each of said brake pads is provided with a slit at one end portion thereof, said slit being engaged with said projection, and the other end portion of said brake pad being pushed into said recess, so that said brake pad is fitted to said tip end face of said brake member, wherein each of said brake pads has a band shape and wherein a force in a thickness direction of the brake pads is only applied to a portion of the brake pads by an outer circumferential surface of the reel tables upon braking.

6. The magnetic tape apparatus as claimed in claim 5, wherein a portion of a lateral pillar portion of the brake members is slanted by an angle and includes a face that faces toward a front side with respect to a rotational direction of the reel tables, wherein the projection is provided at a position on the front face.

7. A magnetic tape apparatus comprising:

a pair of reel tables adapted to be detachably engaged with a tape cassette and rotatably disposed on a chassis with a determined space therebetween, and a pair of brake members adapted to be press-contacted with said reel tables and separated with respect to said reel tables by way of brake pads, wherein each of said brake members is provided with a projection at one end portion of a tip end face thereof and a recess adjacent to the other end portion of said tip end face, and each of said brake pads is provided with a slit at one end portion thereof, said slit being engaged with said projection, and the other end portion of said brake pad being pushed into said recess, so that said brake pad is fitted to said tip end face of said brake member, wherein the other end portion of said tip end face of said brake member is provided with a concave groove, both side edges of said concave groove adapted to be press-contacted with an outer peripheral face of said reel table by way of said brake pad.

\* \* \* \* \*